US009268178B2

(12) United States Patent
Takano et al.

(10) Patent No.: US 9,268,178 B2
(45) Date of Patent: Feb. 23, 2016

(54) LIQUID CRYSTAL DISPLAY DEVICE

(71) Applicants: Midori Takano, Komatsu (JP);
Kazuhiro Takahashi, Kanazawa (JP);
Tatsuya Wakimoto, Hakusan (JP)

(72) Inventors: Midori Takano, Komatsu (JP);
Kazuhiro Takahashi, Kanazawa (JP);
Tatsuya Wakimoto, Hakusan (JP)

(73) Assignee: Japan Display Inc., Tokyo (JP)

( * ) Notice: Subject to any disclaimer, the term of this patent is extended or adjusted under 35 U.S.C. 154(b) by 539 days.

(21) Appl. No.: 13/644,407

(22) Filed: Oct. 4, 2012

(65) Prior Publication Data

US 2013/0088657 A1    Apr. 11, 2013

(30) Foreign Application Priority Data

Oct. 11, 2011    (JP) ................................. 2011-223814

(51) Int. Cl.
*G02F 1/1343*    (2006.01)
*G02F 1/1362*    (2006.01)

(52) U.S. Cl.
CPC .... *G02F 1/134363* (2013.01); *G02F 1/136286* (2013.01); *G02F 1/136213* (2013.01); *G02F 2001/134318* (2013.01)

(58) Field of Classification Search
CPC .............. G02F 1/134363; G02F 2001/134318; G02F 1/136286; G02F 1/136213
USPC ............... 349/38, 39, 43, 110, 139, 141, 143; 345/92
See application file for complete search history.

(56) References Cited

U.S. PATENT DOCUMENTS

| 6,266,116 | B1 | 7/2001 | Ohta et al. |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |
| 2008/0180623 | A1 | 7/2008 | Lee et al. |

(Continued)

FOREIGN PATENT DOCUMENTS

| JP | 6-222397 | 8/1994 |
| JP | 7-159807 | 6/1995 |

(Continued)

OTHER PUBLICATIONS

Computer translation of JP 2008-065300, Mar. 2008, pp. 15-55.*

(Continued)

*Primary Examiner* — Dung Nguyen
*Assistant Examiner* — Tai Duong
(74) *Attorney, Agent, or Firm* — Oblon, McClelland, Maier & Neustadt, L.L.P.

(57) ABSTRACT

According to one embodiment, a device includes a first substrate including first and second gate lines which extend in a first direction, a source line which extends in a second direction, and a pixel electrode including a primary pixel electrode which is located between the first and second gate lines and which extends in the second direction, a second substrate including a common electrode which extends parallel to the primary pixel electrode on both sides across the primary pixel electrode, and a liquid crystal layer held between the first and second substrates. At a position that intersects with the source line, at least one of the first gate line and the second gate line includes a depression provided in an end located on the side of the pixel electrode.

13 Claims, 7 Drawing Sheets

(56) References Cited

U.S. PATENT DOCUMENTS

| | | |
|---|---|---|
| 2008/0186439 A1 | 8/2008 | Kwon et al. |
| 2009/0207363 A1* | 8/2009 | Hirosawa ............... 349/139 |
| 2011/0156995 A1* | 6/2011 | Choi et al. ............... 345/92 |
| 2011/0234947 A1 | 9/2011 | Hirosawa |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 10-171369 A | 6/1998 |
| JP | 10-232392 A | 9/1998 |
| JP | 11-295764 A | 10/1999 |
| JP | 2000-81641 A | 3/2000 |
| JP | 2004-13003 A | 1/2004 |
| JP | 2005-3802 | 1/2005 |
| JP | 3644653 | 2/2005 |
| JP | 2005-242307 | 9/2005 |
| JP | 2006-208881 A | 8/2006 |
| JP | 2006-250985 A | 9/2006 |
| JP | 2008-46521 * | 2/2008 |
| JP | 2008-46521 A | 2/2008 |
| JP | 2008-65300 A | 3/2008 |
| JP | 2008-216607 A | 9/2008 |
| JP | 2009-192822 | 8/2009 |

OTHER PUBLICATIONS

Computer translation of JP 2008-046521, Feb. 2008, pp. 8-26.*
Japanese Office Action issued on Jan. 6, 2015 in Patent Application No. 2011-223814 with English translation.

* cited by examiner

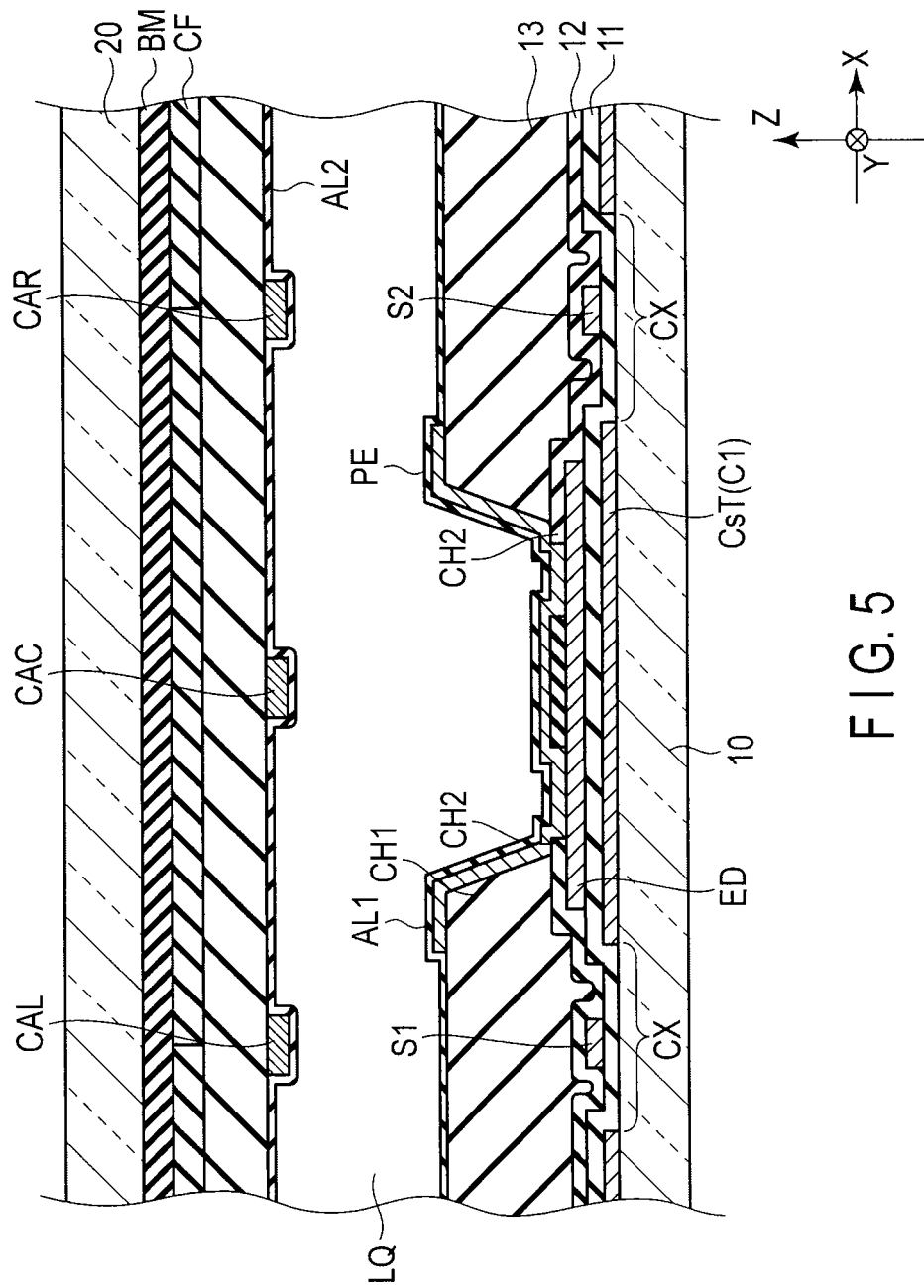
F I G. 5

LIQUID CRYSTAL DISPLAY DEVICE

CROSS-REFERENCE TO RELATED APPLICATIONS

This application is based upon and claims the benefit of priority from Japanese Patent Application No. 2011-223814, filed Oct. 11, 2011, the entire contents of which are incorporated herein by reference.

FIELD

Embodiments described herein relate generally to a liquid crystal display device.

BACKGROUND

Recently, flat display devices have been actively developed, and among others, a liquid crystal display device has been particularly drawing attention for its advantages such as light weight, small thickness, and low power consumption. In particular, regarding an active matrix liquid crystal display device in which a switching element is incorporated in each pixel, attention has been focused on a structure that uses a lateral electric field (including a fringe electric field), such as an in-plane switching (IPS) mode and a fringe field switching (FFS) mode. The liquid crystal display device of such a lateral electric field mode comprises a pixel electrode and a counterelectrode that are formed in an array substrate, and switches a liquid crystal molecule by a lateral electric field substantially parallel to the main surface of the array substrate.

On the other hand, there has also been suggested a technique for switching liquid crystal molecules by a lateral electric field or an oblique electric field generated between a pixel electrode formed on an array substrate and a counterelectrode formed on a countersubstrate.

BRIEF DESCRIPTION OF THE DRAWINGS

FIG. 5 is a sectional view schematically showing a sectional structure when the liquid crystal display panel shown in FIG. 2 is cut along line V-V;

DETAILED DESCRIPTION

Figure 1:
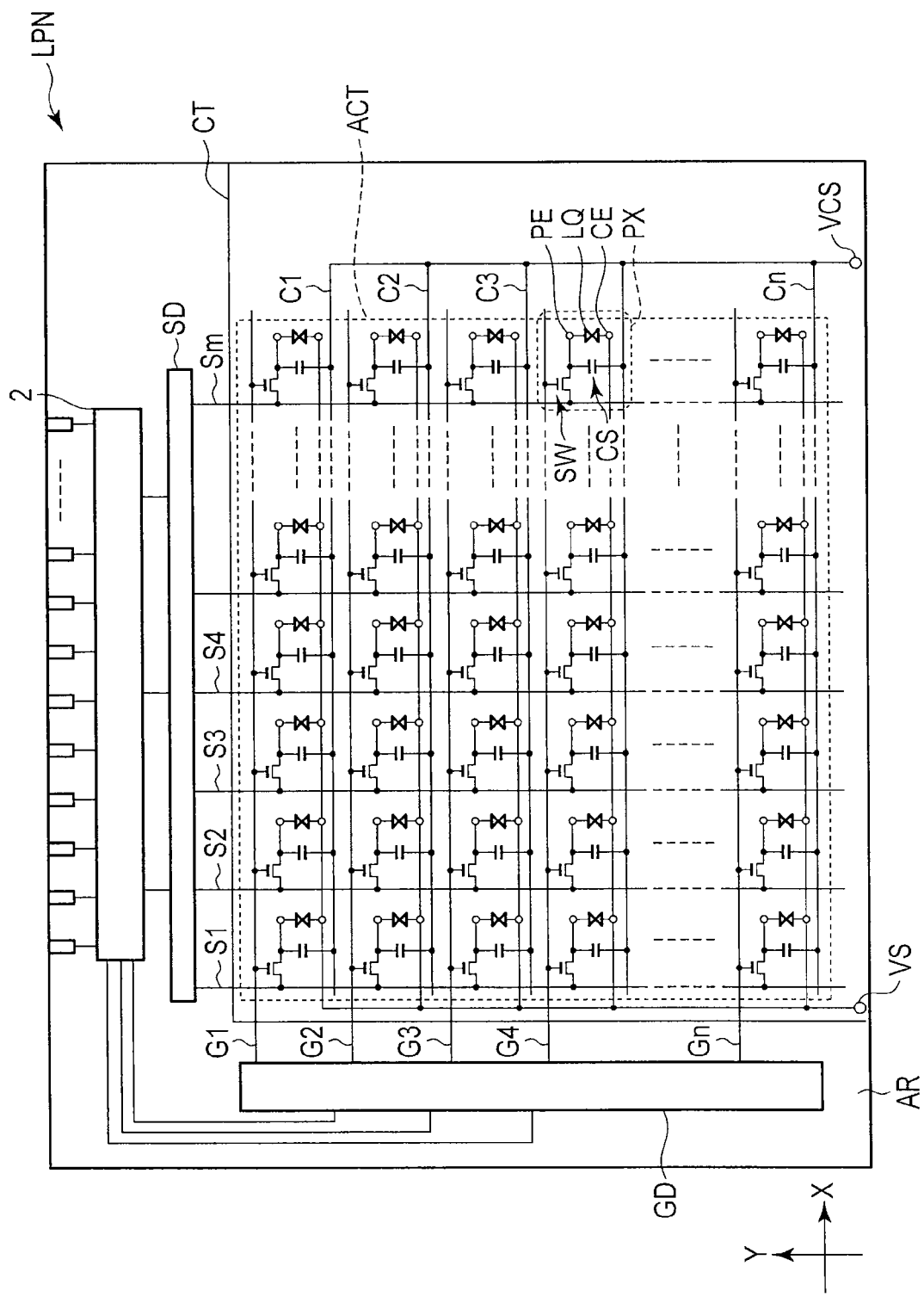
FIG. 1 is a diagram schematically showing the configuration and an equivalent circuit of a liquid crystal display device according to an embodiment.

In general, according to one embodiment, a liquid crystal display device comprises a first substrate, the first substrate comprising a first gate wiring line and a second gate wiring line which extend in a first direction, a source wiring line which extends in a second direction that intersects with the first direction, and a pixel electrode, the pixel electrode comprising a primary pixel electrode which is located between the first gate wiring line and the second gate wiring line and which extends in the second direction; a second substrate comprising a common electrode which extends substantially parallel to the primary pixel electrode on both sides across the primary pixel electrode; and a liquid crystal layer comprising liquid crystal molecules held between the first substrate and the second substrate. At a position that intersects with the source wiring line, at least one of the first gate wiring line and the second gate wiring line comprises a depression provided in an end located on the side of the pixel electrode.

Hereinafter, the embodiment will be described in detail with reference to the drawings. It is to be noted that components having identical or similar functions are provided with the same reference numerals throughout the drawings and are not repeatedly described.

FIG. 1 is a diagram schematically showing the configuration and an equivalent circuit of the liquid crystal display device according to the present embodiment.

That is, the liquid crystal display device comprises an active matrix liquid crystal display panel LPN. The liquid crystal display panel LPN comprises an array substrate AR which is a first substrate, a countersubstrate CT which is a second substrate located to face the array substrate AR, and a liquid crystal layer LQ held between the array substrate AR and the countersubstrate CT. Such a liquid crystal display panel LPN comprises an active area ACT for displaying images. The active area ACT comprises a plurality of m×n pixels PX arranged as a matrix (m and n are positive integers).

The liquid crystal display panel LPN comprises, in the active area ACT, n gate wiring lines G (G1 to Gn), n auxiliary capacitive lines C (C1 to Cn), and m source wiring lines S (S1 to Sm). The gate wiring lines G and the auxiliary capacitive lines C extend substantially linearly, for example, in a first direction (row direction) X. The gate wiring lines G and the auxiliary capacitive lines C are alternately arranged parallel to one another in a second direction Y that intersects with the first direction X. Here, the first direction X and the second direction Y are substantially perpendicular to each other. The source wiring lines S intersect with the gate wiring lines G and the auxiliary capacitive lines C. The source wiring lines S extend substantially linearly in the second direction (column direction) Y. The gate wiring lines G, the auxiliary capacitive lines C, and the source wiring lines S need not extend linearly and may be partly bent.

Each of the gate wiring lines G is drawn out of the active area ACT, and is connected to a gate driver GD. Each of the source wiring lines S is drawn out of the active area ACT, and is connected to a source driver SD. The gate driver GD and the source driver SD are at least partly connected to, for example, a drive IC chip 2 which is formed in the array substrate AR and which has a controller therein.

Each of the pixels PX comprises a switching element SW, a pixel electrode PE, and a common electrode CE. A retention capacitance Cs is formed, for example, between the auxiliary capacitive line C and the pixel electrode PE. The auxiliary capacitive line C is electrically connected to a voltage applied section VCS to which an auxiliary capacitive voltage is applied.

In the present embodiment, the liquid crystal display panel LPN is configured to have the pixel electrode PE formed in the array substrate AR and at least part of the common electrode CE formed in the countersubstrate CT. An electric field formed between the pixel electrode PE and the common electrode CE is mainly used to switch liquid crystal molecules in the liquid crystal layer LQ. The electric field formed between the pixel electrode PE and the common electrode CE is an oblique electric field slightly tilted relative to an X-Y plane defined by the first direction X and the second direction Y or relative to the main surface of the substrate (or is a lateral electric field substantially parallel to the main surface of the substrate).

The switching element SW comprises, for example, an n-channel thin-film transistor (TFT). This switching element SW is electrically connected to the gate wiring line G and the source wiring line S. Such a switching element SW may be either a top gate type or a bottom gate type. Although a semiconductor layer of the switching element SW is made of, for example, amorphous silicon, the semiconductor layer may otherwise be made of polysilicon.

The pixel electrode PE is located in each of the pixels PX, and is electrically connected to the switching element SW. The common electrode CE is located to be shared by the pixel electrodes PE of the pixels PX via the liquid crystal layer LQ. The pixel electrode PE and the common electrode CE are made of a light-transmitting conductive material such as indium tin oxide (ITO) or indium zinc oxide (IZO), but may otherwise be made of other metal materials such as aluminum.

The array substrate AR comprises a power supply VS for applying a voltage to the common electrode CE. This power supply VS is formed, for example, outside the active area ACT. The common electrode CE is drawn out of the active area ACT, and is electrically connected to the power supply VS via an unshown conductive member.

Figure 2:
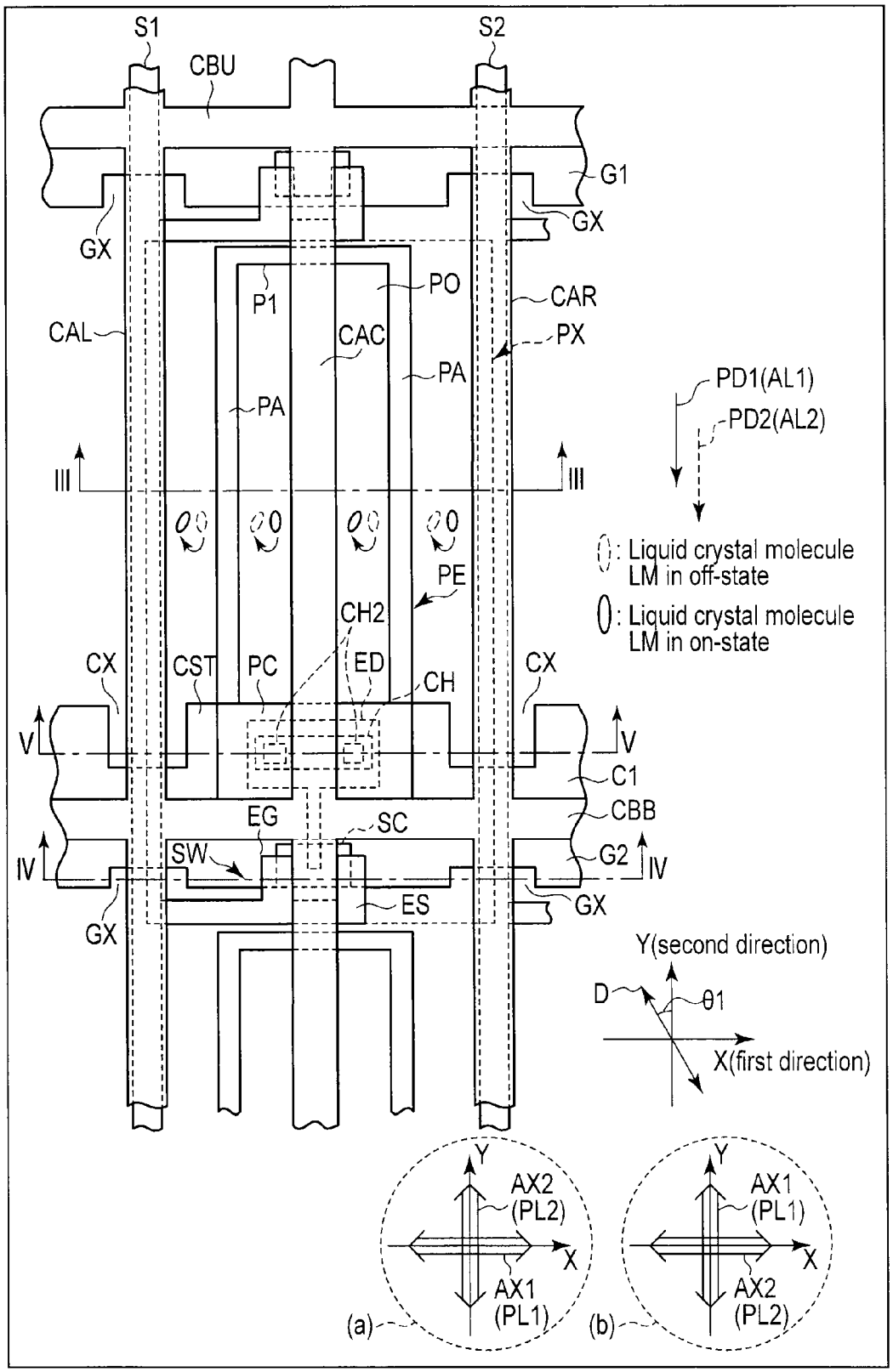
FIG. 2 is a plan view schematically showing a structure example of one pixel when a liquid crystal display panel shown in FIG. 1 is viewed from the side of a countersubstrate.

FIG. 2 is a plan view schematically showing a structure example of one pixel PX when the liquid crystal display panel LPN shown in FIG. 1 is viewed from the side of the counter-substrate. Here, a plan view in the X-Y plane is shown.

The shown pixel PX has an oblong shape such that the dimension in the first direction X is less than that in the second direction Y, as indicated by broken lines. Gate wiring line G1 and gate wiring line G2 extend in the first direction X. Auxiliary capacitive line C1 is located between gate wiring line G1 and gate wiring line G2 that are adjacent to each other. Auxiliary capacitive line C1 extends in the first direction X. Source wiring line S1 and source wiring line S2 extend in the second direction Y. The pixel electrode PE is located between source wiring line S1 and source wiring line S2 that are adjacent to each other. This pixel electrode PE is also located between gate wiring line G1 and gate wiring line G2.

In the example shown, source wiring line S1 is located at the left end of the pixel PX, and source wiring line S2 is located at the right end. Strictly, source wiring line S1 is located on the border between the pixel PX and the left adjacent pixel, and source wiring line S2 is located on the border between the pixel PX and the right adjacent pixel. Gate wiring line G1 is located along the upper end of the pixel PX, and gate wiring line G2 is located along the lower end. Strictly, gate wiring line G1 is located in the vicinity of the border between the pixel PX and the upper adjacent pixel, and gate wiring line G2 is located in the vicinity of the border between the pixel PX and the lower adjacent pixel. Auxiliary capacitive line C1 is located between the center of the pixel PX and gate wiring line G2.

Gate wiring lines G1 and G2 comprise depressions GX provided at the intersections of gate wiring lines G1 and G2 and source wiring lines S1 and S2. The depressions GX are rectangularly depressed in the second direction Y from the lower sides (the side opposite to a primary pixel electrode PA of the pixel PX) of gate wiring lines G1 and G2.

At least one of gate wiring line G1 and gate wiring line G2 comprises, at the intersections of this gate wiring line and source wiring lines S1 and S2, the depressions GX provided in the end on the side of the intervening pixel electrode PE. That is, gate wiring lines G1 and G2 are located between the pixel electrodes PE (between a first pixel electrode and a second pixel electrode) in the second direction Y, and gate wiring lines G1 and G2 comprise, at the intersections of these gate wiring lines and source wiring lines S1 and S2, the depressions provided in at least one of the upper and lower ends (the end on the side of the first pixel electrode).

In the case shown in FIG. 2, at the intersections of gate wiring lines G1 and G2 and source wiring lines S1 and S2, gate wiring lines G1 and G2 are depressed at one end in the second direction Y and thus are narrower in the second direction Y so that gate wiring lines G1 and G2 are distant from the primary pixel electrodes PA of the lower pixels adjacent to gate wiring lines G1 and G2. Gate wiring lines G1 and G2 are wider in the second direction Y in parts located on semiconductor layers SC of the switching elements SW including gate electrodes EG.

In the example shown, the switching element SW is electrically connected to gate wiring line G2 and source wiring line S1. This switching element SW is provided in the vicinity of the intersection of gate wiring line G2 and source wiring line S1.

A gate electrode EG of the switching element SW is electrically connected to (or formed integrally with) gate wiring line G2. A source electrode ES of the switching element SW is electrically connected to (or formed integrally with) source wiring line S1. A drain electrode ED of the switching element SW is electrically connected to the pixel electrode PE via a contact hole CH formed in a region overlapping auxiliary capacitive line C1.

The drain electrode ED of the switching element SW spreads to extend upward in the second direction Y from the lower end of the pixel PX to the bottom of the pixel electrode PE.

Auxiliary capacitive line C1 has a capacitive portion CsT substantially in the center of the pixel PX in the first direction X. That is, auxiliary capacitive line C1 comprises depressions CX provided at the intersections of auxiliary capacitive line C1 and source wiring lines S1 and S2. The depressions CX are depressed from the upper side (the side close to the primary pixel electrode PA) of auxiliary capacitive line C1 in the second direction Y. In this example, the depressions CX are substantially rectangular.

That is, at the intersections of auxiliary capacitive line C1 and source wiring lines S1 and S2, auxiliary capacitive line C1 is depressed at the end on the side of the primary pixel electrode PA and thus is narrower in the second direction Y so that auxiliary capacitive line C1 is distant from the primary pixel electrode PA. Auxiliary capacitive line C1 is wider in the second direction Y in the capacitive portion CsT.

As shown in FIG. 2, the pixel electrode PE comprises the primary pixel electrode PA, a connection portion P1, and a contact portion PC that are electrically connected to one another. The contact portion PC is located in the vicinity of the lower end of the pixel PX (in the vicinity of the switching element SW connected to the pixel electrode PE of the pixel PX). The contact portion PC is located in a region that overlaps the capacitive portion CsT of auxiliary capacitive line C1, and is electrically connected to the switching element SW via the contact hole CH. The contact portion PC is formed to be wider than the primary pixel electrode PA.

Figure 3:
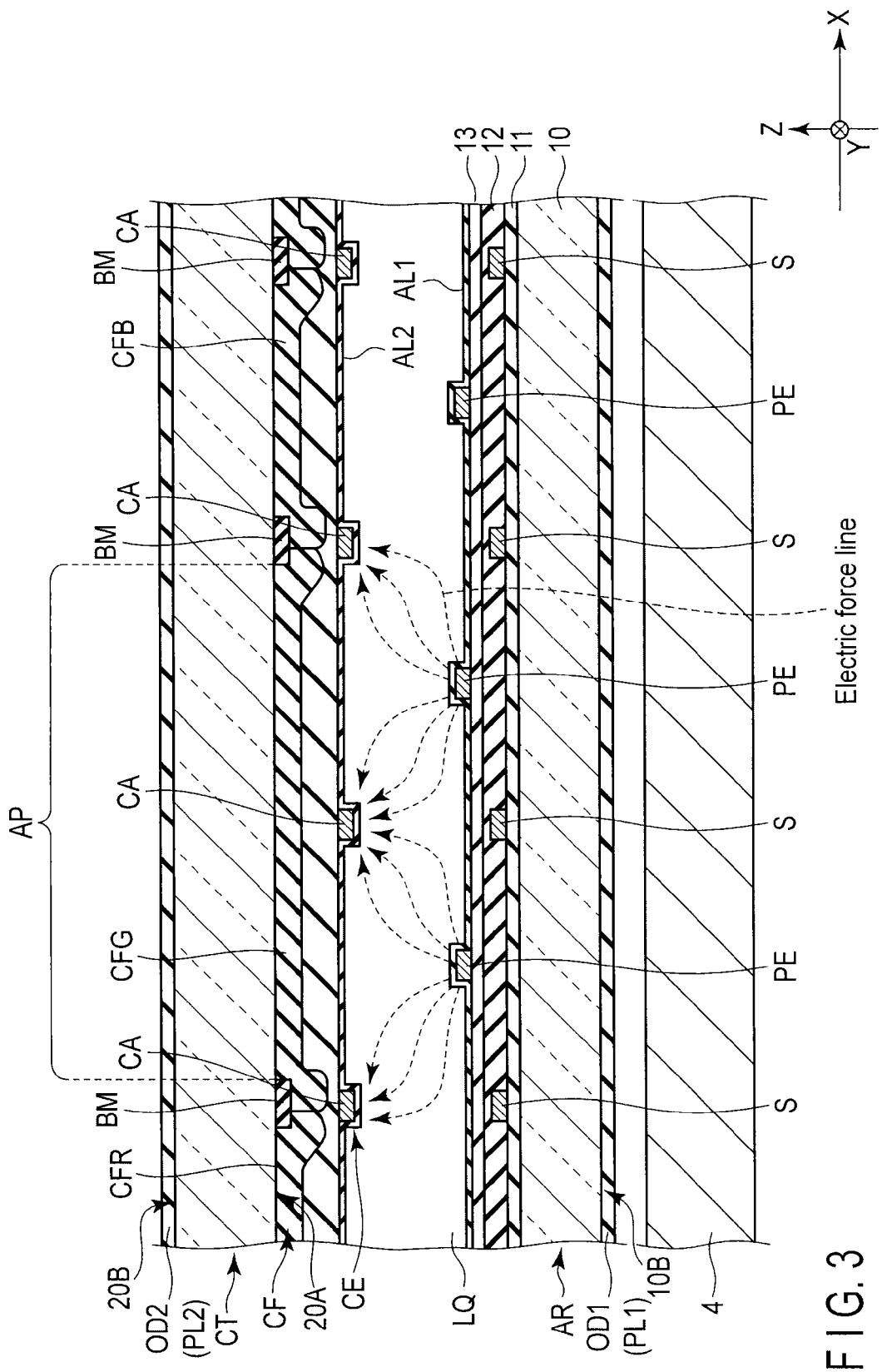
FIG. 3 is a sectional view schematically showing a sectional structure of an array substrate AR when the liquid crystal display panel shown in FIG. 2 is cut along line III-III.

FIG. 3 is a sectional view schematically showing a sectional structure when the liquid crystal display panel LPN shown in FIG. 2 is cut along line III-III. Here, only parts necessary for explanation are shown.

A backlight unit 4 is located in the rear of the array substrate AR that constitutes the liquid crystal display panel LPN. Various forms of backlight units 4 are applicable. Moreover, a backlight unit that uses a light-emitting diode (LED) or a cold cathode fluorescent lamp (CCFL) as a light source is also applicable. The detailed structure of the backlight unit is not described.

The array substrate AR is formed by using a light-transmitting first insulating substrate 10. The source wiring line S is formed on a first interlayer insulating film 11, and is covered by a second interlayer insulating film 12. The unshown gate wiring line and the auxiliary capacitive line are located, for example, between the first insulating substrate 10 and the first interlayer insulating film 11. A planarized film 13 is located on the second interlayer insulating film 12. The pixel electrode PE is formed on the planarized film 13. This pixel electrode PE is located inside the positions immediately above the adjacent source wiring lines S.

A first alignment film AL1 is located on the surface of the array substrate AR facing the countersubstrate CT, and extends over substantially the entire active area ACT. This first alignment film AL1 covers the pixel electrode PE and others, and is also located on the planarized film 13. Such a first alignment film AL1 is made of a material that shows a horizontal alignment property.

The array substrate AR may further comprise part of the common electrode CE.

The countersubstrate CT is formed by using a light-transmitting second insulating substrate 20. This countersubstrate CT comprises black matrices BM, color filters CF, an overcoat layer OC, the common electrode CE, and a second alignment film AL2.

The black matrices BM separate the pixels PX, and form an aperture AP facing the pixel electrode PE. That is, the black matrix BM is located to face wiring lines such as the source wiring lines S, the gate wiring lines, the auxiliary capacitive lines, and the switching element. Although only a part of the black matrix BM that extends in the second direction Y is shown here, the black matrix BM may comprise a part that extends in the first direction X. This black matrix BM is located in an inner surface 20A of the second insulating substrate 20 facing the array substrate AR.

The color filter CF is located to correspond to each pixel PX. That is, the color filter CF is located in the aperture AP in the inner surface 20A of the second insulating substrate 20, and is partly put on the black matrix BM. The color filters CF located in the pixels PX adjacent in the first direction X have different colors. For example, the color filters CF are made of resin materials having three primary colors including red, blue, and green. The red color filter CFR made of the red resin material is located to correspond to the red pixel. The blue color filter CFB made of the blue resin material is located to correspond to the blue pixel. The green color filter (not shown) made of the green resin material is located to correspond to the green pixel. The border between the color filters CF is located to overlap the black matrix BM.

The overcoat layer OC covers the color filter CF. This overcoat layer OC eases the influence of the unevenness of the surface of the color filter CF.

The common electrode CE is formed on the side of the overcoat layer OC facing the array substrate AR. The distance between the common electrode CE and the pixel electrode PE in a third direction Z is substantially uniform. The third direction Z is a direction perpendicular to the first direction X and the second direction Y, or is the normal line direction of the liquid crystal display panel LPN.

The second alignment film AL2 is located on the surface of the countersubstrate CT facing the array substrate AR, and extends over substantially the entire active area ACT. This second alignment film AL2 covers the common electrode CE and the overcoat layer OC. Such a second alignment film AL2 is made of a material that shows a horizontal alignment property.

The first alignment film AL1 and the second alignment film AL2 have been subjected to an alignment process (e.g. rubbing and a light alignment process) for the initial alignment of the liquid crystal molecules in the liquid crystal layer LQ. A first alignment process direction PD1 in which the first alignment film AL1 initially aligns the liquid crystal molecules is parallel to and is opposite to or the same as a second alignment process direction PD2 in which the second alignment film AL2 initially aligns the liquid crystal molecules. For example, the first alignment process direction PD1 and the second alignment process direction PD2 are substantially parallel to and the same as the second direction Y, as shown in FIG. 2.

The array substrate AR and the countersubstrate CT described above are located so that the first alignment film AL1 and the second alignment film AL2 face each other. In this case, between the first alignment film AL1 of the array substrate AR and the second alignment film AL2 of the countersubstrate CT, a predetermined cell gap, for example, a cell gap of 2 to 7 μm is formed by a columnar spacer. The columnar spacer is integrally formed on one of the substrates, for example, by a resin material. The array substrate AR and the countersubstrate CT are affixed to each other by a sealing material (not shown) outside the active area ACT so that the predetermined cell gap is formed.

The liquid crystal layer LQ is held in the cell gap formed between the array substrate AR and the countersubstrate CT, and is located between the first alignment film AL1 and the second alignment film AL2. Such a liquid crystal layer LQ is made of, for example, a liquid crystal material having positive dielectric anisotropy.

A first optical device OD1 is affixed, for example, by an adhesive agent to the outer surface of the array substrate AR, that is, an outer surface 10B of the first insulating substrate 10 that constitutes the array substrate AR. This first optical device OD1 is located on the side of the liquid crystal display panel LPN facing the backlight unit 4, and controls the polarization of incoming light coming into the liquid crystal display panel LPN from the backlight unit 4. This first optical device OD1 includes a first polarizing plate PL1 having a first polarization axis (or first absorption axis).

A second optical device OD2 is affixed, for example, by an adhesive agent to the outer surface of the countersubstrate CT, that is, an outer surface 20B of the second insulating substrate 20 that constitutes the countersubstrate CT. This second optical device OD2 is located on the display surface of the liquid crystal display panel LPN, and controls the polarization of outgoing light coming out of the liquid crystal display panel LPN. This second optical device OD2 includes a second polarizing plate PL2 having a second polarization axis (or second absorption axis) AX2.

The first polarization axis of the first polarizing plate PL1 and the second polarization axis of the second polarizing plate PL2 are, for example, perpendicularly positioned (cross-Nicol). In this case, one of the polarizing plates is located so that, for example, its polarization axis is parallel or perpendicular to the initial alignment direction of the liquid crystal molecules, that is, the first alignment process direction PD1 or the second alignment process direction PD2. When the initial alignment direction is parallel to the second direction Y, the polarization axis of one of the polarizing plates is parallel to the first direction X.

The common electrode CE comprises a primary common electrode CA and a secondary common electrode CB on the countersubstrate CT. In the X-Y plane, the primary common electrode CA extends linearly on both sides across the primary pixel electrode PA in the second direction Y substantially parallel to the primary pixel electrode PA. In other words, the primary common electrode CA faces the source wiring line S or an opening PO, and extends substantially parallel to the primary pixel electrode PA. Such a primary common electrode CA is in the shape of a strip having a uniform width in the first direction X.

In the example shown, three primary common electrodes CA are arranged parallel to one another in the first direction X, and are located at right and left ends of the pixel PX and in the center, respectively. Hereinafter, in order to differentiate these primary common electrodes CA, the left primary common electrode in the diagram is referred to as CAL, the right primary common electrode in the diagram is referred to as CAR, and the central primary common electrode in the diagram is referred to as CAC. Primary common electrode CAL faces source wiring line S1, primary common electrode CAR faces source wiring line S2, and primary common electrode CAC faces the opening PO of the pixel electrode PE. Primary common electrode CAL, primary common electrode CAR, and primary common electrode CAC are electrically connected to one another inside or outside the active area.

In the pixel PX, primary common electrode CAL is located at the left end, and primary common electrode CAR is located at the right end. Strictly, primary common electrode CAL is located on the border between the pixel PX and the left adjacent pixel, and primary common electrode CAR is located on the border between the pixel PX and the right adjacent pixel. Primary common electrode CAC is located substantially in the center of the pixel PX in the first direction X.

In the X-Y plane, the secondary common electrode CB extends linearly in the first direction X between the openings PO of the pixel electrodes PE arranged in the second direction Y. The secondary common electrode CB extends substantially perpendicularly to the primary pixel electrode PA. Such a secondary common electrode CB is in the shape of a strip having a uniform width in the second direction Y.

In the example shown, the secondary common electrodes CB are located between the pixel electrodes PE arranged in the second direction Y, and are disposed on the upper and lower sides of the pixel PX. Hereinafter, in order to differentiate these secondary common electrodes CB, the upper secondary common electrode in the diagram is referred to as CBU, and the lower secondary common electrode in the diagram is referred to as CBB. The secondary common electrode CBU faces gate wiring line G1, and the secondary common electrode CBB faces gate wiring line G2. The secondary common electrode CPU and the secondary common electrode CBB are electrically connected to each other inside or outside the active area. That is, the common electrode CE is grid-shaped in the active area.

In the pixel PX, the secondary common electrode CBU is located at the upper end, and the secondary common electrode CBB is located at the lower end. Strictly, the secondary common electrode CBU is located on the upper side of gate wiring line C1 on the border between the pixel PX and the upper adjacent pixel, and the secondary common electrode CBB is located between gate wiring line G2 and auxiliary capacitive line C1 in this pixel PX.

With regard to the positional relation between the pixel electrode PE and the primary common electrode CA, the primary pixel electrodes PA and the primary common electrodes CA are alternately arranged in the first direction X. The primary pixel electrodes PA and the primary common electrodes CA are arranged substantially parallel to each other. In this case, in the X-Y plane, primary common electrode CAL, primary common electrode CAR, and primary common electrode CAC do not overlap the primary pixel electrode PA.

That is, one primary pixel electrode PA is located between primary common electrode CAL and primary common electrode CAC that are adjacent to each other, and between primary common electrode CAR and primary common electrode CAC. In other words, primary common electrode CAL, primary common electrode CAR, and primary common electrode CAC are arranged on two sides across the position immediately above the primary pixel electrode PA. Alternatively, the primary pixel electrode PA is located between primary common electrode CAL and primary common electrode CAC and between primary common electrode CAR and primary common electrode CAC. Thus, primary common electrode CAL, the primary pixel electrode PA, primary common electrode CAC, the primary pixel electrode PA, and primary common electrode CAR are arranged in the first direction X in this order.

The distance between the pixel electrode PE and the common electrode CE in the first direction X is substantially uniform. That is, the distance between primary common electrode CAL and the primary pixel electrode PA in the first direction X, the distance between primary common electrode CAC and the primary pixel electrode PA in the first direction X, and the distance between primary common electrode CAR and the primary pixel electrode PA in the first direction X are substantially equal.

Figure 4:
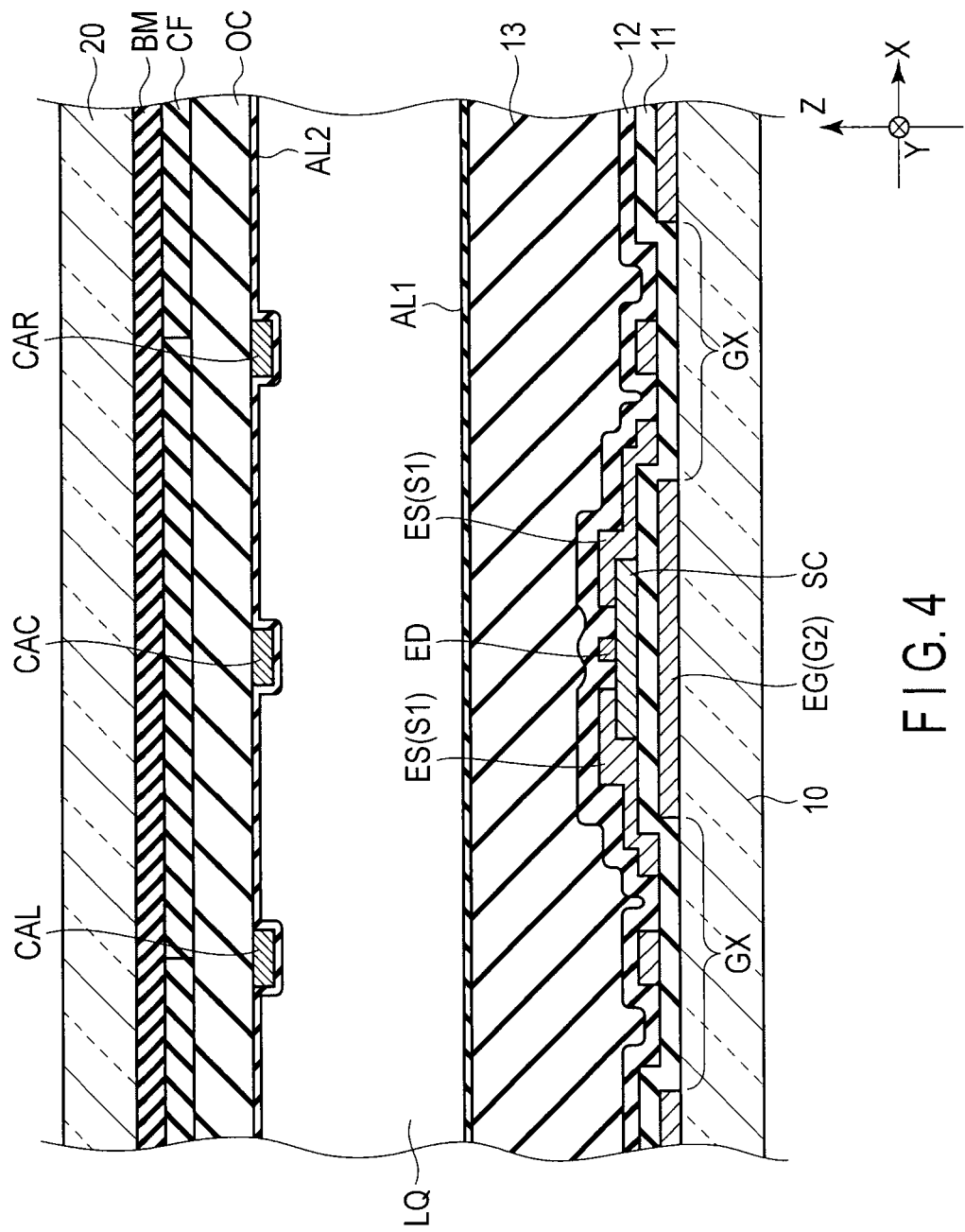
FIG. 4 is a sectional view schematically showing a sectional structure of the array substrate when the liquid crystal display panel shown in FIG. 2 is cut along line IV-IV.

FIG. 4 is a sectional view schematically showing a sectional structure when the liquid crystal display panel LPN shown in FIG. 2 is cut along line IV-IV. Here, only parts necessary for explanation are shown.

The gate electrode EG of the switching element SW is located on the first insulating substrate 10. The gate electrode EG is covered by the first interlayer insulating film 11. The semiconductor layer SC made of amorphous silicon is located on the gate electrode EG via the first interlayer insulating film 11. The source electrode ES and the drain electrode ED are located on the semiconductor layer SC. The end of the source electrode ES is branched into two parts which are located on both ends of the semiconductor layer SC in the first direction X. The drain electrode ED is located on the semiconductor layer SC between two source electrodes ES in the first direction X. The source electrode ES and the drain electrode ED are covered by the second interlayer insulating film 12. The planarized film 13 is located on the second interlayer insulating film 12. The planarized film 13 is covered by the first alignment film AL1.

The black matrix BM is located on the second insulating substrate 20 of the countersubstrate CT. The black matrix BM covers the position facing the depression GX of gate wiring line G2, and is located to extend in the first direction X.

The color filter CF is located on the black matrix BM. The color filter CF is covered by the overcoat layer OC.

The common electrode CE is formed on the side of the overcoat layer OC facing the array substrate AR. Primary common electrode CAL is located to face source wiring line S1. Primary common electrode CAR is located to face source wiring line S2. Primary common electrode CAC is located to face the substantially intermediate position between source wiring lines S1 and S2 in the first direction X.

The second alignment film AL2 is located on the surface of the countersubstrate CT facing the array substrate AR, and extends over substantially the entire active area ACT.

FIG. 5 is a sectional view schematically showing a sectional structure when the liquid crystal display panel LPN shown in FIG. 2 is cut along line V-V. Here, only parts necessary for explanation are shown.

The capacitive portion CsT of auxiliary capacitive line C1 is located on the first insulating substrate 10. The drain electrode ED is located to face the capacitive portion CsT via the first interlayer insulating film 11. The drain electrode ED is covered by the second interlayer insulating film 12. The second interlayer insulating film 12 has contact holes CH2 which expose the drain electrode ED. In this example, contact holes CH2 are provided at two places. The planarized film 13 is located on the second interlayer insulating film 12. The planarized film 13 is provided with contact holes CH1 which expose the two contact holes CH2 of the second interlayer insulating film 12. The pixel electrode PE is located on the planarized film 13. The pixel electrode PE is electrically connected to the drain electrode ED in contact hole CH1 and contact hole CH2. The pixel electrode PE and the planarized film 13 are covered by the first alignment film AL1.

As shown in FIG. 2, the pixel electrode PE comprises the primary pixel electrode PA, a connection portion P1, and a contact portion PC that are electrically connected to one another. The contact portion PC is located in the vicinity of the lower end of the pixel PX (in the vicinity of the switching element SW connected to the pixel electrode PE of the pixel PX). The contact portion PC is located in a region that overlaps the capacitive portion CsT of auxiliary capacitive line C1, and is electrically connected to the switching element SW via the contact hole CH. The contact portion PC is formed to be wider than the primary pixel electrode PA.

The primary pixel electrodes PA extend linearly in the second direction Y from two parts of the contact portion PC to the vicinity of the upper end of the pixel PX. The primary pixel electrodes PA are electrically connected to each other by the connection portion P1 which extends in the first direction X in the vicinity of the upper end of the pixel PX. That is, the pixel electrode PE is provided with the substantially rectangular or circular opening PO surrounded by the primary pixel electrode PA, the connection portion P1, and the contact portion PC. The opening PO is located at the substantially middle position between source wiring line S1 and source wiring line S2, that is, located in the center of the pixel PX.

The black matrix BM is located on the second insulating substrate 20 of the countersubstrate CT. The black matrix BM covers the position facing the depression GX of auxiliary capacitive line C1, and is located to extend in the first direction X.

The color filter CF is located on the black matrix BM. The color filter CF is covered by the overcoat layer OC.

The common electrode CE is formed on the side of the overcoat layer OC facing the array substrate AR. Primary common electrode CAL is located to face source wiring line S1. Primary common electrode CAR is located to face source wiring line S2. Primary common electrode CAC is located to face the substantially intermediate position between source wiring lines S1 and S2 in the first direction X.

The second alignment film AL2 is located on the surface of the countersubstrate CT facing the array substrate AR, and extends over substantially the entire active area ACT.

Now, the operation of the liquid crystal display panel LPN having the above configuration is described with reference to FIG. 2 and FIG. 5.

When no voltage is applied to the liquid crystal layer LQ, that is, when no potential difference (or electric field) is formed between the pixel electrode PE and the common electrode CE (off-state), the major axes of the liquid crystal molecules LM of the liquid crystal layer LQ are aligned to be in the first alignment process direction PD1 of the first alignment film AL1 and in the second alignment process direction PD2 of the second alignment film AL2. This off-state corresponds to an initial alignment state, and the alignment direction of the liquid crystal molecules LM in the off-state corresponds to the initial alignment direction.

Strictly, the liquid crystal molecules LM are not necessarily aligned parallel to the X-Y plane, and are often pretilted. Therefore, the initial alignment direction of the liquid crystal molecules LM here is the direction in which the major axes of the liquid crystal molecules LM in the off-state are orthogonally projected in the X-Y plane. In the following explanation, for simplicity, the liquid crystal molecules LM are aligned parallel to the X-Y plane, and are rotated in a plane parallel to the X-Y plane.

Here, both the first alignment process direction PD1 and the second alignment process direction PD2 are substantially parallel to the second direction Y. In the off-state, the major axes of the liquid crystal molecules LM are initially aligned in a direction substantially parallel to the second direction Y, as indicated by broken lines in FIG. 2. That is, the initial alignment direction of the liquid crystal molecules LM is parallel to the second direction Y (or 0° to the second direction Y).

When the first alignment process direction PD1 and the second alignment process direction PD2 are parallel and identical to each other as in the example shown, the liquid crystal molecules LM are aligned substantially horizontally (at a pretilt angle of about zero) in the vicinity of the intermediate part of the liquid crystal layer LQ in the section of the liquid crystal layer LQ. The liquid crystal molecules LM are aligned at such a pretilt angle that the molecules in the vicinity of the first alignment film AL1 and the molecules in the vicinity of the second alignment film AL2 are symmetrical with respect to this part (splay alignment).

Here, if the first alignment film AL1 is aligned in the first alignment process direction PD1, the liquid crystal molecules LM in the vicinity of the first alignment film AL1 are initially aligned in the first alignment process direction PD1. If the second alignment film AL2 is aligned in the second alignment process direction PD2, the liquid crystal molecules LM in the vicinity of the second alignment film AL2 are initially aligned in the second alignment process direction PD2. When the first alignment process direction PD1 and the second alignment process direction PD2 are parallel and identical to each other, the liquid crystal molecules LM are splay-aligned as described above, and the alignment of the liquid crystal molecules LM in the vicinity of the first alignment film AL1 on the array substrate AR and the alignment of the liquid crystal molecules LM in the vicinity of the second alignment film AL2 on the countersubstrate CT are vertically symmetrical with respect to the intermediate part of the liquid crystal layer LQ as described above. This also provides optical compensation in a direction tilted from the normal direction of the substrate. Therefore, when the first alignment process direction PD1 and the second alignment process direction PD2 are parallel and identical to each other, there is little leakage of light in the case of black display, thereby enabling a high contrast ratio and improved display quality.

When the first alignment process direction PD1 and the second alignment process direction PD2 are parallel and opposite to each other, the liquid crystal molecules LM are aliened at a substantially uniform pretilt angle in the vicinity of the first alignment film AL1, in the vicinity of the second alignment film AL2, and in the intermediate part of the liquid crystal layer LQ in the section of the liquid crystal layer LQ (homogeneous alignment).

Backlight from the backlight unit 4 partly passes through the first polarizing plate PL1, and comes into the liquid crystal display panel LPN. The polarization of the light which has come into the liquid crystal display panel LPN varies depending on the alignment state of the liquid crystal molecules LM when the light passes through the liquid crystal layer LQ. In the off-state, the light which has passed through the liquid crystal layer LQ is absorbed by the second polarizing plate PL2 (black display).

In the meantime, when a voltage is applied to the liquid crystal layer LQ, that is, when a potential difference (or electric field) is formed between the pixel electrode PE and the common electrode CE (on-state), a lateral electric field (or an oblique electric field) substantially parallel to the substrate is formed between the pixel electrode PE and the common electrode CE. The major axes of the liquid crystal molecules LM are rotated in a plane substantially parallel to the X-Y plane under the influence of the electric field, as indicated by solid lines in the drawing.

In the example shown in FIG. 2, the liquid crystal molecules LM in a region between the primary pixel electrode PA and primary common electrode CAL and in a region between the primary pixel electrode PA and primary common electrode CAC are rotated clockwise relative to the second direction Y, and are aligned toward the lower left in the drawing. The liquid crystal molecules LM in a region between the primary pixel electrode PA and primary common electrode CAR and in a region between the primary pixel electrode PA and primary common electrode CAC are rotated counter-clockwise relative to the second direction Y, and are aligned toward the lower right in the drawing.

When an electric field is thus formed between the pixel electrode PE and the common electrode CE in each of the pixels PX, the alignment direction of the liquid crystal molecules LM is divided into a plurality of directions from the position that overlaps the pixel electrode PE, and a domain is formed in each alignment direction. That is, a plurality of domains are formed in one pixel PX.

In this on-state, the backlight which has come into the liquid crystal display panel LPN from the backlight unit 4 partly passes through the first polarizing plate PL1, and comes into the liquid crystal display panel LPN. The backlight which has come into the liquid crystal layer LQ changes its polarization state. In this on-state, at least part of the light which has passed through the liquid crystal layer LQ passes through the second polarizing plate PL2 (white display).

Primary common electrode CAL located immediately above source wiring line S1 and primary common electrode CAR located immediately above source wiring line S2 respectively face the black matrices BM. However, both primary common electrode CAL and primary common electrode CAR have a width less than or equal to that of the black matrix BM in the first direction X, and do not extend toward the pixel electrode PE from the position that overlaps the black matrix BM. Therefore, the region contributing to display per pixel corresponds to the region between the pixel electrode PE and primary common electrode CAL, the region between the pixel electrode PE and primary common electrode CAC, and the region between the pixel electrode PE and primary common electrode CAR, out of the region between the black matrices BM or between source wiring line S1 and source wiring line S2.

In the liquid crystal display device described above, a relatively high DC voltage is applied to the gate wiring line G. Therefore, for example, in the vicinity of the primary pixel electrode PA which is at a short distance from the gate wiring line G, the liquid crystal molecules LM are rotated from the initial alignment direction, and the control of alignment in a desired direction becomes difficult.

Moreover, at the intersection of the gate wiring line G and the source wiring line S, electric fields generated by the voltages applied to the common electrode CE, the gate wiring line G, and the source wiring line S interact with one another, and the liquid crystal molecules LM may be rotated from the initial alignment direction.

As a result, in the vicinity of the intersection of the gate wiring line G and the source wiring line S, display quality deteriorates because of light leakage or burn-in.

Accordingly, in the liquid crystal display device according to the present embodiment, the depression GX is provided in the gate wiring line G to increase the distance between the gate wiring line G and the primary pixel electrode PA at the intersection of the source wiring line S and the gate wiring line G. When the distance between the gate wiring line G and the primary pixel electrode PA is thus increased, it is possible to lessen the influence of the voltage applied to the gate wiring line G on the alignment of the liquid crystal molecules LM, and to inhibit the deterioration of display quality.

The countersubstrate CT includes a position that faces the depression GX of the gate interconnect G, and the black matrix BM is disposed around the aperture AP. That is, the intersection of the gate wiring line G and the source wiring line S is located inside the end of the black matrix BM in the second direction Y, and faces the black matrix BM. Therefore, in the vicinity of the intersection of the gate wiring line G and the source wiring line S, there may be a part in which the liquid crystal molecules LM are rotated from the initial alignment direction because of the interaction of the electric fields generated by the voltages applied to the common electrode CE, the gate wiring line G, and the source wiring line S. Even in this case, this part is covered by the black matrix BM and is not visually recognized, and the deterioration of display quality can be inhibited.

As the depression GX is provided, the region of the intersection of the gate wiring line G and the source wiring line S is reduced. Thus, it is possible to improve the dull waveforms of signals applied to the gate wiring line G and the source wiring line S when the gate wiring line G and the source wiring line S are affected by the voltages applied thereto. It is also possible to inhibit a short-circuit failure between the gate wiring line G and the source wiring line S.

Similarly, in the vicinity of the primary pixel electrode PA which is at a short distance from the auxiliary capacitive line C, the liquid crystal molecules LM are rotated from the initial alignment direction, and the control of alignment in a desired direction becomes difficult.

Moreover, at the intersection of the auxiliary capacitive line C and the source wiring line S, electric fields generated by the voltages applied to the common electrode CE, the auxiliary capacitive line C, and the source wiring line S interact with one another, and the liquid crystal molecules LM may be rotated from the initial alignment direction.

As a result, in the vicinity of the intersection of the auxiliary capacitive line C and the source wiring line S, display quality deteriorates because of light leakage or burn-in.

Thus, in the liquid crystal display device according to the present embodiment, the depression CX is provided in the auxiliary capacitive line C to increase the distance between the auxiliary capacitive line C and the primary pixel electrode PA at the intersection of the source wiring line S and the auxiliary capacitive line C. When the distance between the auxiliary capacitive line C and the primary pixel electrode PA is thus increased, it is possible to lessen the influence of the voltage applied to the auxiliary capacitive line C on the alignment of the liquid crystal molecules LM, and to inhibit the deterioration of display quality.

The countersubstrate CT includes a position that faces the depression CX of the auxiliary capacitive line C, and the black matrix BM is disposed around the aperture AP. That is, the intersection of the auxiliary capacitive line C and the source wiring line S is located inside the end of the black matrix BM in the second direction Y, and faces the black matrix BM. Therefore, in the vicinity of the intersection of the auxiliary capacitive line C and the source wiring line S, there may be a part in which the liquid crystal molecules LM are rotated from the initial alignment direction because of the interaction of the electric fields generated by the voltages applied to the common electrode CE, the auxiliary capacitive line C, and the source wiring line S. Even in this case, this part is covered by the black matrix BM and is not visually recognized, and the deterioration of display quality can be inhibited.

As the depression CX is provided, the region of the intersection of the auxiliary capacitive line C and the source wiring line S is reduced. Thus, it is possible to improve the dull waveforms of signals applied to the auxiliary capacitive line C and the source wiring line S when the auxiliary capacitive line C and the source wiring line S are affected by the voltages applied thereto. It is also possible to inhibit a short-circuit failure between the auxiliary capacitive line C and the source wiring line S.

In the liquid crystal display device according to the present embodiment, in the X-Y plane, the secondary common electrode CBB is located between the pixel electrodes PE of the pixels PX where the connection portions P1 of the pixel electrodes PE are arranged in the second direction Y. When one pixel is viewed in the X-Y plane, the pixel electrode PE is disposed on the array substrate AR inside the common electrode CE disposed on the countersubstrate CT. In other words, in one pixel, the pixel electrode PE is surrounded by the common electrode CE. According to this arrangement, one pixel has the starting point and end point of an electric force line as shown in FIG. 5, and the electric force line in this pixel does not leak to the adjacent pixel. This inhibits, for example, the effect of electric fields applied to the liquid crystal layer LQ on each other between the pixels PX adjacent in the second direction Y. Consequently, the liquid crystal molecules in the pixel do not move because of the electric field from the adjacent pixel, and the deterioration of display quality can be inhibited.

That is, according to the present embodiment, the deterioration of display quality can be inhibited.

Furthermore, according to the present embodiment, a high transmittance can be obtained in the electrode gap between the pixel electrode PE and the common electrode CE. Therefore, in order to sufficiently increase the transmittance per pixel, it is possible to increase the inter-electrode distances between the pixel electrode PE and primary common electrode CAL as well as primary common electrode CAR. Moreover, for product specifications different in pixel pitch, a peak condition of a transmittance distribution can be used by changing the inter-electrode distance (i.e. by changing the location of the primary common electrode CA relative to the pixel electrode PE located substantially in the center of the pixel PX). That is, in the display mode according to the present embodiment, the microprocessing of the electrodes is not always needed from a low-resolution product specification having a relatively large pixel pitch to a high-resolution product specification having a relatively small pixel pitch, and products with various pixel pitches can be provided by setting the inter-electrode distance. Therefore, it is possible to readily fulfill demands for higher transmittance and higher resolution.

According to the present embodiment, the transmittance is sufficiently reduced regarding a transmittance distribution in the region that overlaps the black matrix BM. The reason is that there is no electric field leakage to the outside of the pixel from the position of the common electrode CE and that no undesired lateral electric field is generated between the pixels adjacent across the black matrix BM so that the liquid crystal molecules in the region that overlaps the black matrix BM maintains the initial alignment state as in the off-state (or the black display). Therefore, even when the color filters of the adjacent pixels are different in color, the mixing of colors can be inhibited, and the deterioration of color reproduction and the deterioration of the contrast ratio can be inhibited.

When the array substrate AR and the countersubstrate CT are out of alignment, the horizontal inter-electrode distances between the common electrode CE and two sides across the pixel electrode PE may be different. However, such misalignment is caused in all the pixels PX, and therefore produces no difference of electric field distribution among the pixels PX and has a significantly small influence on the display of images. Even if the array substrate AR and the countersubstrate CT are out of alignment, undesired electric field leakage to the adjacent pixels can be inhibited. Therefore, even when the color filters of the adjacent pixels are different in color, the mixing of colors can be inhibited, and the deterioration of color reproduction and the deterioration of the contrast ratio can be inhibited.

According to the present embodiment, each of primary common electrodes CAR and CAL faces the source wiring line S. Especially when primary common electrode CAL and primary common electrode CAR are respectively located immediately above source wiring line S1 and source wiring line S2, the aperture AP can be expanded and the transmittance of the pixel PX can be improved as compared with the case where primary common electrode CAL and primary common electrode CAR are located closer to the pixel electrode PE than source wiring line S1 and source wiring line S2.

Primary common electrode CAL and primary common electrode CAR are respectively located immediately above source wiring line S1 and source wiring line S2, so that the inter-electrode distances between the pixel electrode PE and primary common electrode CAL as well as primary common electrode CAR can be increased, and a more horizontal lateral electric field can be formed. This makes it possible to maintain a greater angle of view which is an advantage of, for example, an IPS mode that is a conventional configuration.

According to the present embodiment, a plurality of domains can be formed in one pixel. Thus, the angle of view can be optically compensated in a plurality of directions, and a greater angle of view can be obtained.

Although the initial alignment direction of the liquid crystal molecules LM is parallel to the second direction Y in the example described above, the initial alignment direction of the liquid crystal molecules LM may be a diagonal direction D that diagonally intersects with the second direction Y as shown in FIG. 2. Here, an angle θ1 of the initial alignment direction D with the second direction Y is an angle greater than 0° and less than 45°. The angle θ1 is highly effective in controlling the alignment of the liquid crystal molecules LM when about 5 to 30°, preferably 20° or less. That is, the initial alignment direction of the liquid crystal molecules LM is preferably substantially parallel to a direction that is angled at 0 to 20° with the second direction Y.

Although the liquid crystal layer LQ is made of a liquid crystal material having positive dielectric anisotropy in the example described above, the liquid crystal layer LQ may be made of a liquid crystal material having negative dielectric anisotropy. However, although not described in detail, the polarity of the dielectric anisotropy is reversed, so that the angle θ1 is preferably 45 to 90°, particularly preferably 70° or greater in the case of a negative liquid crystal material.

Almost no lateral electric field is formed (or no electric field sufficient to drive the liquid crystal molecules LM is formed) on the pixel electrode PE or the common electrode CE even in the on-state, so that the liquid crystal molecules LM hardly move from the initial alignment direction as in the off-state. Thus, even if the pixel electrode PE and the common electrode CE are made of a light-transmitting conductive material such as ITO, the backlight hardly passes through these regions and hardly contributes to display in the on-state. Therefore, the pixel electrode PE and the common electrode CE do not necessarily have to be made of a transparent conductive material, and may be made of a conductive material such as aluminum, silver, or copper.

According to the present embodiment, the structure of the pixel PX is not limited to the example shown in FIG. 2.

Figure 6:
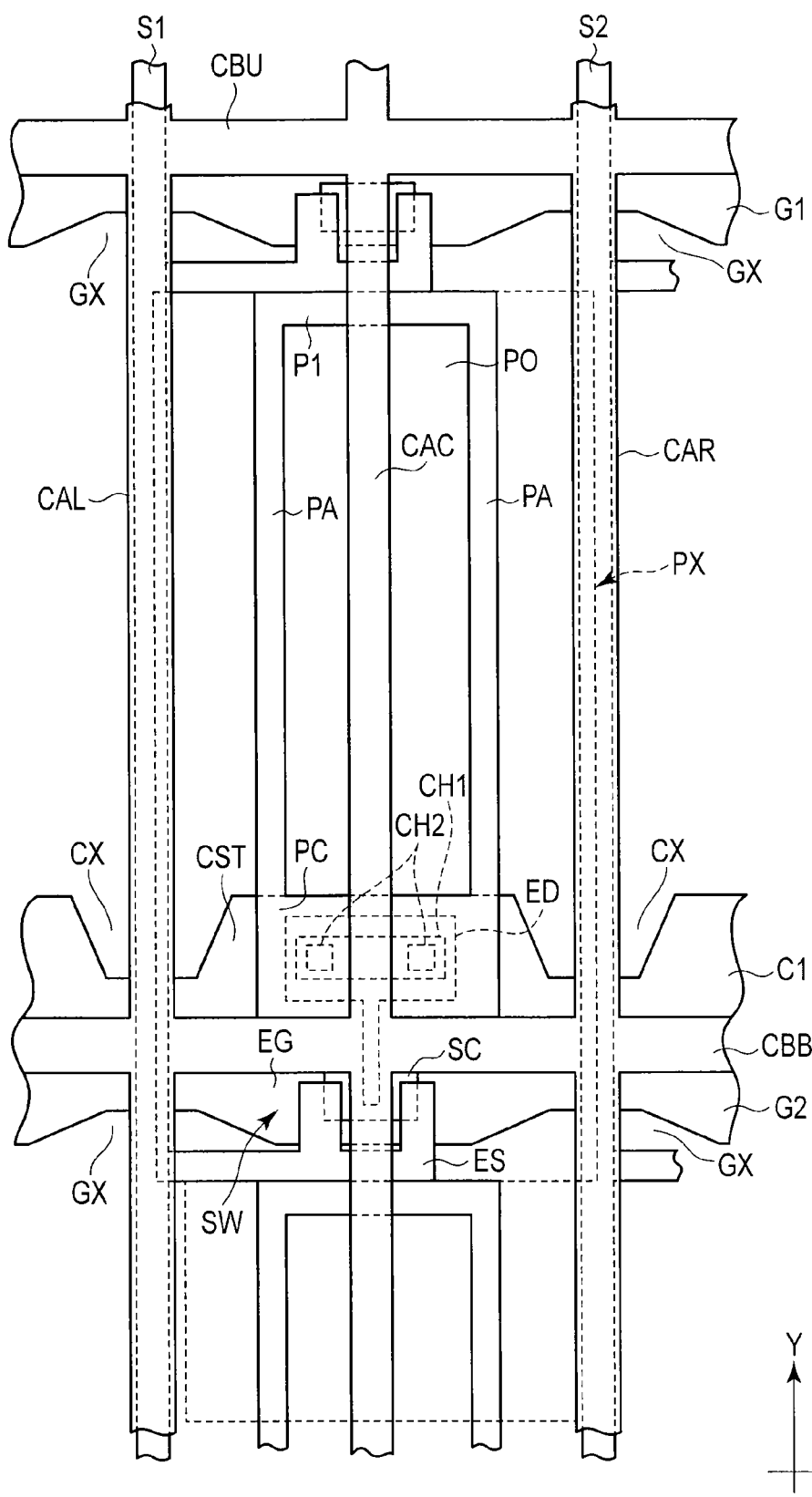
FIG. 6 is a plan view schematically showing another structure example of one pixel when the liquid crystal display panel shown in FIG. 1 is viewed from the side of the countersubstrate.

FIG. 6 is a plan view schematically showing another structure example of one pixel PX when the liquid crystal display panel LPN in FIG. 1 is viewed from the side of the countersubstrate. In the following explanation, components similar to those in the embodiment described above are provided with the same reference numerals and are not described.

In the example shown in FIG. 6, the depression GX of the gate wiring line G and the depression CX of the auxiliary capacitive line C are different in configuration from those in the liquid crystal display device described above. In the example shown in FIG. 6, the depression GX and the depression CX are substantially trapezoidal. That is, the depression GX is wider in the first direction X in parts closer to the end of the gate wiring line G where the depression GX is open. Similarly, the depression CX is wider in the first direction X in parts closer to the end of the auxiliary capacitive line C where the depression CX is open. That is, the parts of the depression GX and the depression CX closer to the primary pixel electrode PA are wider in the first direction X.

The configuration is similar in other respects to that of the liquid crystal display device described above. When the depression GX and the depression CX are thus substantially trapezoidal, the distance between the primary pixel electrode PA and the gate wiring line G as well as the auxiliary capacitive line C is also greater at the intersection of the source wiring line S and the gate wiring line G and at the intersection of the source wiring line S and the auxiliary capacitive line C. This makes it possible to lessen the influence of the voltages applied to the gate wiring line G and the auxiliary capacitive line C on the alignment of the liquid crystal molecules LM, and to inhibit the deterioration of display quality.

In the example shown in FIG. 6, the parts of the depression GX and the depression CX closer to the primary pixel electrode PA are wider in the first direction X. It is therefore possible to lessen the influence of the voltages applied to the gate wiring line G and the auxiliary capacitive line C on the alignment of the liquid crystal molecules LM, and to inhibit the deterioration of display quality.

The intersection of the gate wiring line G and the source wiring line S and the intersection of the auxiliary capacitive line C and the source wiring line S face the black matrix BM. Therefore, even if there is a part in which the liquid crystal molecules LM are rotated from the initial alignment direction, this part is covered by the black matrix BM and is not visually recognized, and the deterioration of display quality can be inhibited.

As the depression GX and the depression CX are provided, the region of the intersection of the gate wiring line G and the source wiring line S and the region of the intersection of the auxiliary capacitive line C and the source wiring line S are reduced. Thus, it is possible to improve the dull waveforms of signals applied to the wiring lines and to inhibit a short-circuit failure.

Figure 7:
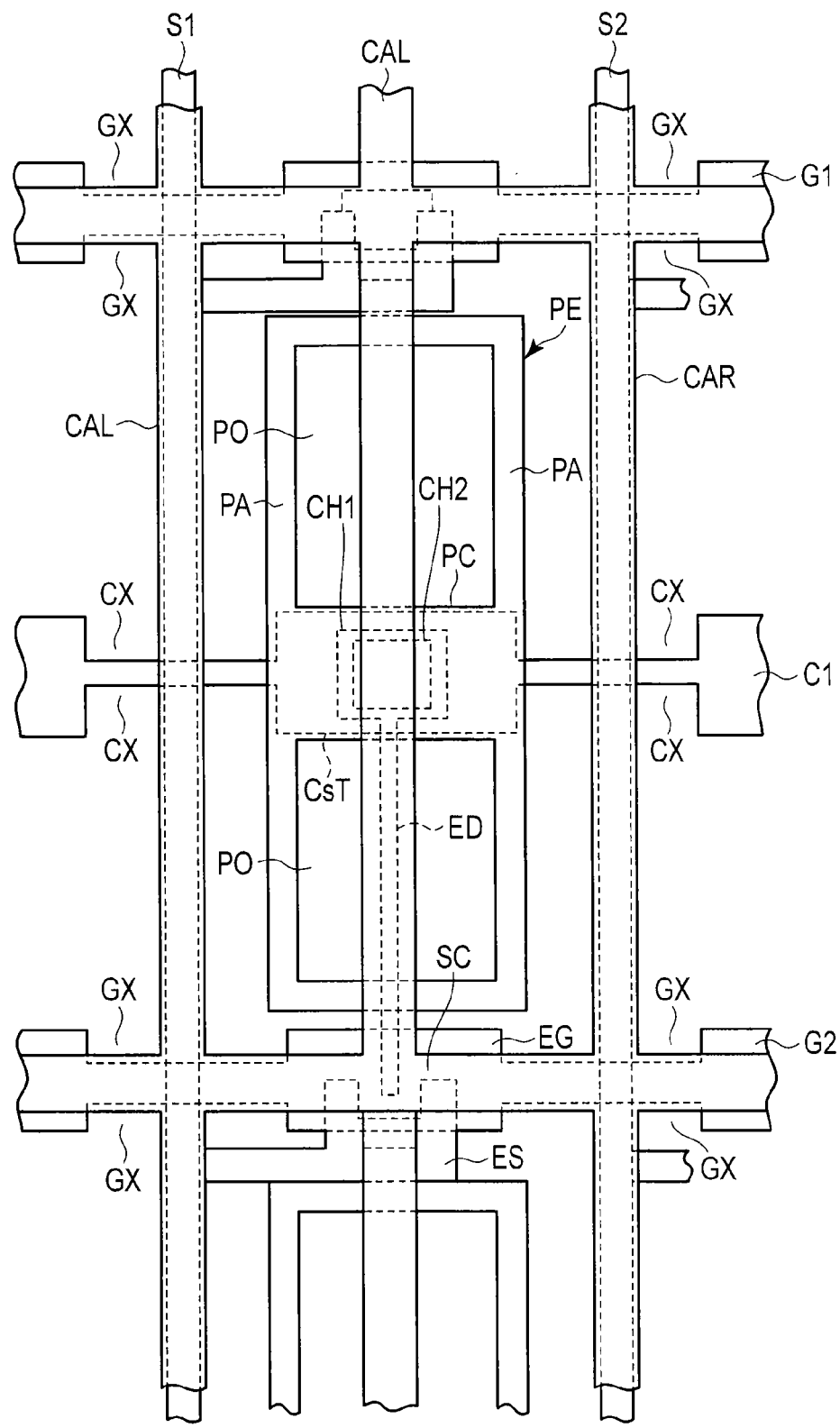
FIG. 7 is a plan view schematically showing another structure example of one pixel when the liquid crystal display panel shown in FIG. 1 is viewed from the side of the countersubstrate.

FIG. 7 is a plan view schematically showing another structure example of one pixel when the liquid crystal display panel shown in FIG. 1 is viewed from the side of the countersubstrate. In the following explanation, components similar to those in the embodiment described above are provided with the same reference numerals and are not described.

In this example, the pixel electrode PE comprises the primary pixel electrode PA, the connection portion P1, and the contact portion PC that are electrically connected to one another. The contact portion PC is located substantially in the center of the pixel PX in the first direction X and the second direction Y. The primary pixel electrodes PA are located to extend toward the upper end and the lower end in the second direction Y from four ends of the contact portion PC in the first direction X and the second direction Y. The connection portions P1 are located in the vicinity of the lower end and upper end of the pixel PX, and electrically connect two primary pixel electrodes PA extending from the contact portion PC toward the upper end and also electrically connect two primary pixel electrodes PA extending toward the lower end. Thus, in this example, two openings PO are provided above and under the contact portion PC in the second direction Y. The two openings PO are located at substantially intermediate positions between source wiring line S1 and source wiring line S2, that is, located in the center of the pixel PX in the first direction X.

The drain electrode ED of the switching element SW extends in the second direction Y from the position that overlaps the semiconductor layer SC to the region where the contact portion PC is located. The drain electrode ED is located at a position that faces primary common electrode CAC. The drain electrode ED is electrically connected to the contact portion PC via contact holes CH1 and CH2 in the region that overlaps the contact portion PC.

In this example, auxiliary capacitive line C1 extends in the first direction X substantially in the center of the pixel PX in the second direction Y. Auxiliary capacitive line C1 comprises the capacitive portion CsT located in the region that overlaps the contact portion PC, and the depressions CX provided at the positions that intersect with source wiring lines S1 and S2.

The depressions CX are provided in both ends in the second direction Y, and the parts of auxiliary capacitive line C1 that intersect with source wiring lines S1 and S2 are narrower in the second direction Y.

Furthermore, in this example, as auxiliary capacitive line C1 is located in the center of the pixel PX in the second direction Y, the distance between gate wiring line G2 and the upper pixel electrode PE is smaller than in the case shown in FIG. 2. Therefore, at the positions that intersect with source wiring lines S1 and S2, the depressions GX of gate wiring line G2 are provided in both ends in the second direction Y. The parts of gate wiring line G2 that intersect with source wiring lines S1 and S2 are narrower in the second direction Y so that the distance from the upper pixel electrode PE and the distance from the lower pixel electrode PE are greater.

In this case, the black matrix (not shown) is located to face the depression CX of auxiliary capacitive line C1 and the depression GX of gate wiring line G2.

The configuration is similar in other respects to that of the liquid crystal display device shown in FIG. 2. When the depression GX and the depression CX are thus provided in both ends of the wiring lines in the second direction Y, the distance between the gate wiring line G and the primary pixel electrode PA is also greater at the intersection of the source wiring line S and the gate wiring line G. That is, at the position that intersects with the source wiring line S, the depression GX is provided in the upper end of the gate wiring line G to increase the distance between the gate wiring line G and the upper primary pixel electrode PA, and the depression GX is provided in the lower end of the gate wiring line G to increase the distance between the gate wiring line G and the lower primary pixel electrode PA. This makes it possible to lessen the influence of the voltage applied to the gate wiring line G on the alignment of the liquid crystal molecules LM, and to inhibit the deterioration of display quality.

The intersection of the gate wiring line G and the source wiring line S faces the black matrix BM. Therefore, even if there is a part in which the liquid crystal molecules LM are rotated from the initial alignment direction, this part is covered by the black matrix BM and is not visually recognized, and the deterioration of display quality can be inhibited.

As the depression GX and the depression CX are provided, the region of the intersection of the gate wiring line G and the source wiring line S and the region of the intersection of the auxiliary capacitive line C and the source wiring line S are reduced. Thus, it is possible to improve the dull waveforms of signals applied to the wiring lines and to inhibit a short-circuit failure.

Although the depressions GX are provided in both ends of the gate wiring line G in the second direction Y in the example shown in FIG. 7, the depression GX has only to be provided in at least one end. Even in this case, if the distance from the primary pixel electrode PA is greater at one end of the gate wiring line G, it is possible to lessen the influence of the voltage applied to the gate wiring line G on the alignment of the liquid crystal molecules LM, and to inhibit the deterioration of display quality. Even in this case, it is also possible to improve the dull waveforms of signals applied to the wiring lines and to inhibit a short-circuit failure.

Similarly, although the depressions CX are provided in both ends of the auxiliary capacitive line C in the second direction Y in the example shown in FIG. 7, the depression CX has only to be provided in at least one end. Even in this case, it is possible to improve the dull waveforms of signals applied to the wiring lines, inhibit a short-circuit failure, and inhibit the deterioration of display quality.

As described above, according to the present embodiment, it is possible to provide a liquid crystal display device in which the deterioration of display quality can be inhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate, the first substrate comprising a first gate wiring line and a second gate wiring line which extend in a first direction, a source wiring line which extends in a second direction that intersects with the first direction, a switching element comprising a drain electrode, a first insulating film covering the drain electrode and comprising first contact holes which expose a part of the drain electrode, a second insulating film located on the first insulating film and comprising a second contact hole which exposes the first contact holes, and a pixel electrode, the pixel electrode comprising a primary pixel electrode which is located between the first gate wiring line and the second gate wiring line and which extends in the second direction;
a second substrate comprising a common electrode which extends substantially parallel to the primary pixel electrode on both sides across the primary pixel electrode; and
a liquid crystal layer comprising liquid crystal molecules held between the first substrate and the second substrate,
wherein the pixel electrode is electrically connected to the drain electrode in the first contact holes and the second contact hole,
at a position that intersects with the source wiring line, at least one of the first gate wiring line and the second gate wiring line comprises a depression provided in an end located on a side of the pixel electrode, and
the first substrate further comprises an auxiliary capacitive line which extends in the first direction and which comprises a capacitive portion and a second depression, the capacitive portion overlapping a contact portion of the pixel electrode, the second depression being provided in at least one end in the second direction at a position that intersects with the source wiring line.

2. The liquid crystal display device according to claim 1, wherein the second substrate further comprises a black matrix facing at least the depression.

3. The liquid crystal display device according to claim 1, wherein the depression is substantially rectangular.

4. The liquid crystal display device according to claim 1, wherein the depression is wider in the first direction in parts closer to an end where the depression is open.

5. The liquid crystal display device according to claim 1, wherein between the pixel electrodes arranged in the second direction, the second substrate further comprises a secondary common electrode which extends in the first direction.

6. A liquid crystal display device comprising:
a first substrate, the first substrate comprising a gate wiring line which extends in a first direction, a source wiring line which extends in a second direction that intersects with the first direction, a switching element comprising a drain electrode, a first insulating film covering the drain electrode and comprising first contact holes which expose a part of the drain electrode, a second insulating film located on the first insulating film and comprising a second contact hole which exposes the first contact holes, and a first pixel electrode and a second pixel electrode, the first pixel electrode and the second pixel electrode comprising primary pixel electrodes which are arranged in the second direction across the gate wiring line and which extend substantially parallel to the second direction;

a second substrate comprising a common electrode which extends substantially parallel to the primary pixel electrodes on both sides across the primary pixel electrodes which are arranged in the second direction; and a liquid crystal layer comprising liquid crystal molecules held between the first substrate and the second substrate, wherein the second pixel electrode is electrically connected to the drain electrode in the first contact holes and the second contact hole, at a position that intersects with the source wiring line, the gate wiring line comprises a depression provided in an end in the second direction on at least a side of the first pixel electrode, the first substrate further comprises an auxiliary capacitive line which extends substantially parallel to the gate wiring line and which comprises a capacitive portion overlapping a contact portion of the second pixel electrode, and the auxiliary capacitive line comprises a second depression provided in at least one end in the second direction at a position that intersects with the source wiring line.

7. The liquid crystal display device according to claim 6, wherein the first substrate further comprises a switching element which switches electric connection between the source wiring line and the second pixel electrode.

8. The liquid crystal display device according to claim 6, wherein the second substrate further comprises a black matrix facing at least the depression.

9. The liquid crystal display device according to claim 7, wherein the second substrate further comprises a black matrix facing at least the depression.

10. The liquid crystal display device according to claim 6, wherein the gate wiring line is located between the first pixel electrode and the second pixel electrode, the auxiliary capacitive line is located on a second pixel electrode side of the gate wiring line, and the depression of the gate wiring line is located on a first pixel electrode side and the second depression of the auxiliary capacitive line is located on the second pixel electrode side.

11. The liquid crystal display device according to claim 6, wherein the depression is substantially rectangular.

12. The liquid crystal display device according to claim 6, wherein the depression is wider in the first direction in parts closer to an end where the depression is open.

13. The liquid crystal display device according to claim 6, wherein between the first pixel electrode and the second pixel electrode that are arranged in the second direction, the second substrate further comprises a secondary common electrode which extends in the first direction.

* * * * *